(12) United States Patent
Farrugia et al.

(10) Patent No.: US 10,577,458 B2
(45) Date of Patent: Mar. 3, 2020

(54) POWDERS FOR LASER SINTERING

(71) Applicant: XEROX CORPORATION, Norwalk, CT (US)

(72) Inventors: Valerie Farrugia, Oakville (CA); Edward G. Zwartz, Mississauga (CA); Sandra J. Gardner, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 59 days.

(21) Appl. No.: 15/914,184

(22) Filed: Mar. 7, 2018

(65) Prior Publication Data

US 2019/0276593 A1 Sep. 12, 2019

(51) Int. Cl.
| | | |
|---|---|---|
| C08G 63/52 | (2006.01) |
| B33Y 70/00 | (2020.01) |
| C08K 3/36 | (2006.01) |
| C08L 67/06 | (2006.01) |
| C08J 3/14 | (2006.01) |

(52) U.S. Cl.
CPC .............. *C08G 63/52* (2013.01); *B33Y 70/00* (2014.12); *C08J 3/14* (2013.01); *C08K 3/36* (2013.01); *C08L 67/06* (2013.01); *C08G 2140/00* (2013.01); *C08J 2367/06* (2013.01)

(58) Field of Classification Search
None
See application file for complete search history.

(56) References Cited

U.S. PATENT DOCUMENTS

| | | |
|---|---|---|
| 8,834,777 B2 | 9/2014 | Simon et al. |
| 8,981,010 B2 | 3/2015 | Schmidt et al. |
| 9,470,992 B2 | 10/2016 | Uchino et al. |
| 9,611,355 B2 | 4/2017 | Martinoni et al. |
| 9,746,818 B2 | 8/2017 | Uchino et al. |
| 2017/0298194 A1 | 10/2017 | Farrugia et al. |
| 2018/0009975 A1 | 1/2018 | Farrugia et al. |
| 2018/0186926 A1* | 7/2018 | Watanabe ............... C08L 67/00 |
| 2018/0230274 A1* | 8/2018 | Liu .......................... B29C 67/00 |

FOREIGN PATENT DOCUMENTS

| | | |
|---|---|---|
| CN | 102417786 A | 4/2012 |
| CN | 106905672 A | 6/2017 |
| JP | 2005127176 A * | 5/2005 |
| JP | 2005128176 A * | 5/2005 |
| WO | 2017063352 A1 | 4/2017 |

OTHER PUBLICATIONS

JP-2005127176-A, Machine Translation, May 2005 (Year: 2005).*
JP-2005128176-A, Machine Translation, May 2005 (Year: 2005).*

(Continued)

*Primary Examiner* — Satya B Sastri
(74) *Attorney, Agent, or Firm* — MH2 Technology Law Group LLP

(57) ABSTRACT

Provided herein is a powder composition comprising a silica-infused crystalline polyester particle for laser sintering comprising at least one crystalline polyester resin and silica nanoparticles present in the particle an amount ranging from about 10 wt % to about 60 wt % relative to the total weight of the particle. Further provided herein are methods of preparing silica-infused crystalline polyester particles.

18 Claims, 1 Drawing Sheet

(56) References Cited

OTHER PUBLICATIONS

Ou et al., A New Conception on the Toughness of Nylon 6/Silica Nanocomposite Prepared via in Situ Polymerization, J. of Polymer Sci: Part B: Polymer Physics, 1998, pp. 789-795, vol. 36, John Wiley & Sons, Inc.
Swain et al., Effect of Nano-silica/Nano-alumina on Mechanical and Physical Properties of Polyurethane Composites and Coatings, Transactions on Electrical and Electronic Materials, 2013, pp. 1-8, vol. 14, No. 1.
Extended European Search Report dated Jul. 23, 2019 in corresponding European Application No. 19160660.7 (8 pages).

* cited by examiner

POWDERS FOR LASER SINTERING

DETAILED DESCRIPTION

Field of the Disclosure

This disclosure relates generally to printing powders for use in additive manufacturing, also known as three-dimensional (3D) printing, and in particular, to the addition of silica nanoparticles to crystalline polyester as a mechanical reinforcement filler.

Background 3D printing has increased in recent years as an easy, cost-effective means to create real parts from 3D computer-aided design (CAD) data. 3D printing encompasses numerous additive manufacturing technologies including Stereolithography (SLA), Selective Laser Sintering (SLS), and Fused Deposition Modeling (FDM). These manufacturing processes provide custom parts by accurately "printing" layer upon layer of plastic or metal build materials until a 3D form is created.

3D printing provides many advantages over traditional manufacturing techniques. For example, intricate structural designs that could not be formed previously using conventional techniques may be formed using 3D printing. Further, 3D printing provides a cost-effective method for manufacturing batch sizes as small as a single unit. Designs may be created using CAD software by an end user, or a user may download web-based software instructions to create a needed repair part or desired decorative structure at home or small business. Different print heads can add a plurality of different materials to the object being created (e.g., rubber, plastics, paper, polyurethane-like materials, metals, etc.)

One of the 3D printing methods is SLS. SLS printing typically employs powdered plastics and/or polymers as build materials for printing objects. Many SLS materials are composites of polyamide (nylon) with or without additives such as powdered glass, carbon fibers, aluminum powder, etc. In a SLS system, a $CO_2$ laser beam is used to selectively fuse or melt the polymer particles deposited in a thin layer. The polymer particles in the top powder layer coalescence in addition to adhering with previous sintered layers. The powder is thus sintered into shape by a laser in a layer-by-layer fashion to build the objects from "scratch." Laser sintering usually uses particles ranging from about 50 to about 300 microns, where the degree of detail is limited only by the precision of the laser and fineness of the powder.

For crystalline or semi-crystalline polymers that are known for use in SLS processing, this implies that crystallization should be inhibited during processing as long as possible, or at least for several sintered layers. Thus, the processing temperature should be precisely controlled in between the melting temperature ($T_m$) and the crystallization temperature ($T_c$) of the given polymer. This meta-stable thermodynamic region of undercooled polymer melt is called the "sintering window" of SLS processing for a given polymer.

One problem limiting SLS technology for a wide-ranging industrial scope is the narrow variety of applicable polymers due to a lack of a sufficient sintering window. To date, only a few types of polymers have been successfully applied for this technology, mainly comprised of crystalline polyamides, thermoplastic polyurethans, and polyether amides (PEBA). Amorphous resins, elastomers, or other more flexible materials such as polypropylene and polyethylene cannot be used. Materials such as polypropylene and polyethylene do not have sufficient sintering windows for SLS technology. Materials for SLS 3D printing should be crystalline and have a sharp melting point and recrystallization point, such as melting and recrystallization points that are about a 30° C. to a 50° C. difference in temperature.

In addition to the sintering window, the shape and surface texture are properties that may be considered for an SLS material. The shape should be as close to spherical as possible to induce a free-flowing behavior. A spherical shape with a smooth surface may help as SLS powders are distributed by a roller or blade system on the part bed of an SLS machine, as the powders will not be further compacted. Polyamide powders that may be potato-shaped may therefore be inaqeduate, as are particles obtained from cryogenic milling due to inferior powder flowability and a reduced powder density. Cryogenic milled powders have a tendency to results in weak, less condensed SLS parts with low density.

There is thus a need in the art for other more rigid or more flexible materials than currently used polyamides, so as to improve hardness, tensile strength, and other physical and chemical properties of the resultant printed structures. Additionally, there is a need for polymeric materials with lower melting and crystallization temperatures ($T_c$ and $T_m$), such that the 3D printer may use less power. This includes polymeric materials containing specific nanofillers to help improve chemical and mechanical resistance.

SUMMARY

Disclosed herein are powder compositions comprising silica-infused crystalline polyester particles for laser sintering comprising at least one crystalline polyester resin and silica nanoparticles. In certain embodiments, the silica nanoparticles may be present in the particle in an amount ranging from about 5 wt % to about 60 wt % relative to the total weight of the particle, such as an amount ranging from about 10 wt% to about 30 wt %, an amount of about 10 wt %, or an amount of about 20 wt %.

In another embodiment the crystalline polyester resin is an unsaturated crystalline polyester resin derived from at least one organic diacid, such as fumaric acid, and at least one polyol, such as at least one polyol chosen from 1,4-butanediol and 1,6-hexanediol. In certain embodiments disclosed herein, the at least one organic diacid may be present in the crystalline polyester resin in an amount ranging from about 25 mole % to about 90 mole %, such as at least about 50 mole % or at least about 70 mole %. In certain embodiments, the at least one polyol is a mixture of 1,4-butanediol and 1,6-hexanediol, such as a mixture comprising about 25 mole % 1,4-butanediol and about 75 mole % 1,6-hexanediol. In one embodiment, the crystalline polyester resin is an unsaturated crystalline polyester resin derived from fumaric acid and a mixture of about 25 mole % 1,4-butanediol and about 75 mole % 1,6-hexanediol.

In yet another embodiment the silica-infused crystalline polyester particles have a volume-average particle diameter ranging from about 5 microns to about 500 microns, such as about 5 microns to about 350 microns or about 30 microns to about 50 microns.

In certain embodiments disclosed herein, the melting temperature ($T_m$) of the silica-infused crystalline polyester particle ranges from 50° C. to about 100° C., such as ranging from about 55° C. to about 90° C. or ranging from about 60° C. to 85° C. In other embodiments disclosed herein, the crystallization temperature ($T_c$) of the silica-infused crystalline polyester particle ranges from 50° C. to about 60° C., such as about 58° C.

Further disclosed herein are methods for manufacturing a silica-infused crystalline polyester particle for laser sintering comprising preparing a solution comprising a crystalline polyester resin and a polyvinyl alcohol dissolved in an organic solvent; adding an aqueous solution of a polyvinyl alcohol and silica nanoparticles to the solution; and precipitating a silica-infused crystalline polyester particle. According to certain embodiments, the aqueous solution of polyvinyl alcohol is added to the solution before the silica nanoparticles are added to the solution, and according to certain embodiments, the silica nanoparticles are added to the aqueous solution of polyvinyl alcohol to form a silica/polyvinyl alcohol solution, and the silica/polyvinyl alcohol solution is then added to the solution comprising a crystalline polyester resin and a polyvinyl alcohol dissolved in an organic solvent.

In certain embodiments of the methods disclosed herein, the crystalline polyester resin and the polyvinyl alcohol are dissolved in the organic solvent at a temperature ranging from about 80° C. to about 100° C., such as about 90° C.

Further disclosed herein are methods for manufacturing a silica-infused crystalline polyester particle comprising preparing a solution comprising crystalline polyester resin, silica nanoparticles, and polyvinyl alcohol dissolved in an organic solvent; adding an aqueous solution of polyvinyl alcohol to the solution; and precipitating a silica-infused crystalline polyester particle. In certain embodiments, the crystalline polyester resin, silica nanoparticles, and the polyvinyl alcohol are dissolved in the organic solvent at a temperature ranging from about 80° C. to about 100° C., such as at about 90° C.

According to certain embodiments, the methods disclosed herein further comprise adding at least one initiator, such as an azo initiator, to the solution.

In various embodiments of the methods disclosed herein, the silica nanoparticles are added to the solution in an amount such that the silica nanoparticles are present in the particle an amount ranging from about 5 wt % to about 60 wt % relative to the total weight of the particle, such as from about 10 wt% to about 30 wt %, about 10 wt %, or about 20 wt %.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1:
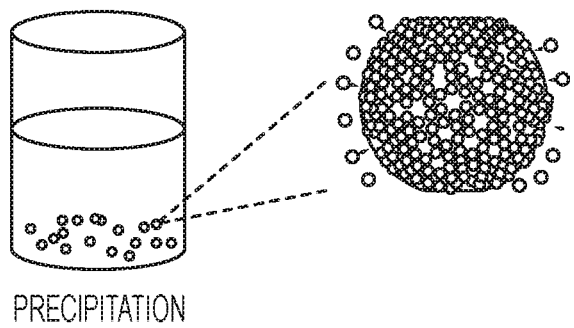
FIG. 1 is a schematic of an exemplary silica-infused microcrystalline particle prepared according to embodiments disclosed herein, showing silica nanoparticles on the surface of the crystalline polyester resin.

It should be noted that some details of the figures may have been simplified and are shown to facilitate understanding of the embodiments rather than to maintain strict structural accuracy, detail, and scale.

DESCRIPTION OF THE EMBODIMENTS

Reference will now be made in detail to embodiments of the present disclosure, examples of which are illustrated in the accompanying drawings. The following description is merely exemplary.

As used herein, the term "3D printing" refers to any type of additive manufacturing that can form a 3D object using deposition of material in a three-dimensional space. 3D printing can include extrusion deposition wherein material is extruded and then hardened, such as fused deposition modeling (FDM) and fused filament fabrication (FFF). 3D printing also encompasses binding of particulate materials, wherein the particulate materials are deposited in a two-dimensional plane and subsequently bound together, such as selective laser sintering (SLS) and selective laser melting (SLM).

As used herein, "nanoparticle," such as a silica nanoparticle, indicates a particulate material that may be considered a whole unit and may be measured in nanometers. In certain embodiments, a nanoparticle may range from about 0.1 nanometer to about 1,000 nanometers, such as from about 1 nanometer to about 100 nanometers.

As used herein, the term "microparticle" indicates a particulate material that may be considered a whole unit and may be measured in microns. In certain embodiments, a microparticle may range from about 0.01 microns to about 100,000 microns, such as from about 0.1 microns to about 1,000 microns.

As used herein, the term "silica-infused" indicates a material, such as a crystalline polyester resin, wherein silica has been incorporated in and/or on the polymer matrix. In certain embodiments, silica-infused indicates that silica is on the surface of a polymer resin, dispersed throughout a polymer resin, or both on the surface and dispersed throughout a polymer resin. If silica is dispersed throughout a polymer resin, the silica may be dispersed relatively equally or unequally throughout the polymer resin.

As used herein, "crystalline" refers to a polyester with a three-dimensional order. "Semicrystalline resins" refers to resins with a crystalline percentage of, for example, from about 10 to about 90% crystalline, such as from about 12% to about 70% crystalline. As used herein, "crystalline polyester resins" and "crystalline polyester" encompass both crystalline resins and semicrystalline resins, unless otherwise specified.

Disclosed herein are powders for use in additive manufacturing processes, such as SLS processes. The powders disclosed herein comprise silica-infused crystalline polyester microparticles. The silica-infused crystalline polyester microparticles may be obtained by a mixing process that allows for compatibility between the crystalline polyester resin and the silica.

As is disclosed herein, one method for preparing a silica-infused crystalline polyester microparticle is by direct mixing of silica into the polymer matrix by either melt or solution blending. In certain embodiments, increasing the loading of the silica within the microparticle may act as a reinforcement additive to the crystalline polyester, thereby improving the chemical and mechanical resistance of the microparticle. When the silica-infused crystalline polyester microparticles disclosed herein are used in 3D printing, their improved chemical and mechanical resistance results in improvements in the final sintered part as compared to final sintered parts prepared from non-silica-infused resins, such as non-silica infused crystalline polyesters or polyamides.

Another method for preparing a silica-infused crystalline polyester microparticle is by delayed addition of silica, wherein the silica is situated on the surface of the crystalline polyester particles. In certain embodiments, increasing the amount of silica situated on the surface of the microparticles may allow the silica to function as a flow agent, anti-caking additive, and/or an electrostatic charge control agent. According, the silica-infused crystalline polyester microparticles disclosed herein may have enhanced flowability, anti-caking properties, and electrostatic charge control as compared to non-silica infused crystalline polyesters or polyamides.

In certain embodiments disclosed herein, there are provided methods comprising adding at least about 5 weight % for a silica nanoparticle to a crystalline polyester to form a matrix, such as at least about 10 weight %, at least about 15 weight %, at least about 20 weight %, at least about 25 weight %, or at least about 30 weight %, relative to the total weight of the crystalline polyester. In certain embodiments, there are provided methods comprising adding a weight percent of silica nanoparticles ranging from about 5 weight % to about 30 weight %, such as from about 10 weight % to about 20 weight %.

In certain embodiments, the composite is formed into particles having a size suitable for selective laser sintering. In certain embodiments, silica-infused crystalline polyester microparticles disclosed herein may have an effective average particle diameter ranging from about 1 micron to about 10,000 microns, such as from about 5 microns to about 3000 microns, about 30 microns to about 50 microns, about 5 microns to about 350 microns, or about 20 microns to about 60 microns.

Adding silica to the crystalline polyester resins disclosed herein may provide silica-infused crystalline polyester microparticles having good flow, enhanced anti-caking properties, and electrostatic charge control for SLS printing applications, as well as improved chemical and mechanical resistance of the final parts. The enhanced properties that may be exhibited for the silica-infused crystalline microparticles are, in certain embodiments, enhanced not only over non-silica-infused crystalline polyester microparticles, but also over crystalline polyester microparticles to which other fillers may have been added. In certain embodiments of the disclosure, adding silica nanoparticles, such as adding about 20% of 10 nm colloidal silica, may increases both the strength and the hardness of the crystalline polyester resin by a factor of about 1.5 to about 2.5.

Crystalline Resins

According to certain embodiments, disclosed herein is a silica-infused crystalline microparticles prepared from a crystalline resin. Examples of crystalline resins may include, for example, polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. In certain embodiments, the crystalline resin is a crystalline polyamide resin or a crystalline polyester resin.

Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), poly(butylene-succinimide), and mixtures thereof.

Examples of crystalline polyester resins include, but are not limited to, poly(ethylene-adipate), polypropylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), poly(decylene-sebacate), poly(decylene-decanoate), poly-(ethylene-decanoate), poly-(ethylene-dodecanoate), poly(hexane-dodecanate), poly(nonylene-sebacate), poly(nonylene-decanoate), poly(nonylene-dodecanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), and combinations thereof.

The crystalline polyester resins, which are available from a number of sources, may possess various melting temperatures ($T_m$) of, for example, from at least about 30° C. to about 120° C., such as from about 50° C. to about 100° C., from about 55° C. to about 90° C., or from about 60° C. to 85° C. Lower $T_m$ materials can be obtained, for example by increasing the polyol content (such as, for example, by increasing the 1,4-butanediol content). The recrystallization temperature ($T_c$), however, should not be so low that particle blocking (adhesion) is comprised. For example, in certain embodiments, the $T_c$ is greater than or equal to about 55° C., such as greater than or equal to about 58° C., greater than or equal to about 65° C., or greater than or equal to about 75° C. In certain embodiments, the crystalline polyester resins disclosed herein may be at least about 60° C. lower in temperature transitions ($T_c$ and $T_m$) compared to commercially available polyamide powders, such as at least about 70° C., 80° C., or at least about 90° C. lower in temperature transitions. For example, in certain embodiments the crystalline polyester resins disclosed herein have a $T_c$ of about 58° C. and a $T_m$ of about 93° C. as measured by differential scanning calorimetry (DSC), whereas commercially available PA-12 powder has a $T_c$ of about 144° C. and a $T_m$ of about 186° C. as measured by DSC.

The crystalline polyester resins may have, for example, a number average molecular weight ($M_n$), as measured by gel permeation chromatography (GPC) of, for example, from about 1,000 to about 50,000, such as from about 2,000 to about 25,000, from about 3,000 to about 15,000, or from about 6,000 to about 12,000. The weight average molecular weight ($M_w$) of the crystalline polyester resin may, in certain embodiments, be less than or equal to about 50,000, such as from about 2,000 to about 50,000, from about 3,000 to about 40,000, from about 10,000 to about 30,000, or from about 21,000 to about 24,000, as determined by GPC using polystyrene standards. The molecular weight distribution ($M_w/M_n$) of the crystalline polyester resin may, in certain embodiments, range from about 2 to about 6, such as from about 3 to about 4. The crystalline polyester resins may have an acid value of about 2 to about 20 mg KOH/g, such as from about 5 to about 18 mg KOH/g, or from about 12 to about 15 mg KOH/g. The acid value (or neutralization number) is the mass of potassium hydroxide (KOH) in milligrams that is required to neutralize one gram of the crystalline polyester resin.

In certain embodiments of the disclosure, the crystalline polyester resin may be a saturated crystalline polyester resin or an unsaturated crystalline polyester resin. In certain embodiments disclosed herein, the crystalline polyester resin is an unsaturated crystalline polyester resin derived from at least one organic diacid and at least one polyol.

Examples of organic diacids including vinyl diacids selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, and a diester or anhydride thereof.

The at least one organic diacid may be selected in an amount, for example, ranging from about 25 mole % to about 75 mole %, such as from about 30 mole % to about 60 mole %, from about 40 mole % to about 50 mole %, at least about 25 mole %, at least about 50 mole %, or about 50 mole %. In certain embodiments, the at least one organic diacid is fumaric acid, and in certain embodiments, the fumaric acid is present in an amount ranging from about 40 mole % to about 60 mole %. The at least one organic diacid may be present in a sufficient quantity to allow the resin to cure (crosslink), for example in the presence of a thermal initiator.

Examples of the at least one polyol include an aliphatic diol, such as a linear aliphatic diol having a carbon number of 4 to 20 in the main chain portion. Examples of aliphatic diols include, for example, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among them, examples of aliphatic diols that may be used according to certain embodiments disclosed herein include 1,4-butanediol, 1,6-hexanediol, and a combination thereof.

The at least one polyol may be selected in an amount, for example, ranging from about 25 mole % to about 75 mole %, such as from about 40 mole % to about 70 mole %, from about 50 mole % to about 60 mole %, at least about 25 mole %, at least about 50 mole %, or about 50 mole %.

In certain embodiments, the at least one polyol is a mixture of at least two polyols. In certain embodiments, the mixture may comprise two polyols present in a ratio of at least about 10 mole % to 90 mole %, such as about 20 mole % to 80 mole %, 25 mole % to 75 mole %, or 50 mole % to 50 mole %. In certain embodiments, the at least one polyol is a mixture of 1,4-butanediol and 1,6-hexanediol, and in certain embodiments, the mixture of 1,4-butanediol and 1,6-hexanediol is present in an amount of about 25 mole % 1,4-butanediol and about 75 mole % 1,6-hexanediol.

In embodiments, the crystalline polyester resin may be derived from a monomer system comprised of at least one polyol selected from among 1,4-butanediol (1,4-BD), 1,6-hexanediol (1,6-HD), and mixtures thereof with at least one organic diacid selected from among fumaric acid, succinic acid, oxalic acid, adipic acid, and mixtures thereof. In certain embodiments, disclosed herein are unsaturated crystalline polyester resins derived from fumaric acid and a mixture of 1,4-butanediol and 1,6-hexanediol, as shown below:

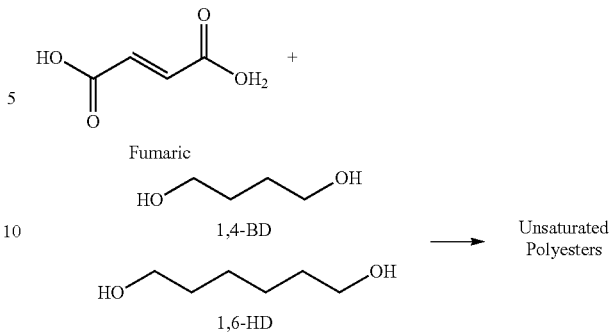

Thermal Initiators

The crystalline polyester resins and microparticles disclosed herein may be further strengthened through the use of initiators, also known as crosslinkers. According to certain embodiments, the initiators may act on the unsaturated carbons polymer backbones of the unsaturated crystalline polyester disclosed herein, initiating further crosslinking of the polyesters to each other. This additional crosslinking, also referred to as curing, functions to add strength to the crystalline polyester resins and microparticles.

In certain embodiments, the process of crosslinking crystalline polyester resins or microparticles may be accomplished by applying a coating of an initiator onto the particle surfaces.

Examples of suitable crosslinkers include, but are not limited to, for example, free radical or thermal initiators, such as organic peroxides and azo compounds. A thermal initiator may be largely inactive at room temperature, activating in solution to crosslink the polymer only when the solution is heated above a certain temperature.

Examples of suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di(2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di(benzoyl peroxy) hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di(t-butyl peroxy) hexane, t-butyl cumyl peroxide, .alpha.-.alpha.-bis(t-butyl peroxy)diisopropyl benzene, di-t-butyl peroxide and 2,5-dimethyl 2,5-di(t-butyl peroxy) hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di(t-butyl peroxy) valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2-di(t-butyl peroxy) butane, ethyl 3,3-di(t-butyl peroxy) butyrate and ethyl 3,3-di(t-amyl peroxy) butyrate, and combinations thereof. Examples of suitable azo compounds include 2,2,'-azobis(2,4-dimethylpentane nitrile), azobis-isobutyronitrile, 2,2'-azobis (isobutyronitrile), 2,2'-azobis(2,4-dimethyl valeronitrile), 2,2'-azobis(methyl butyronitrile), 2,2'-azobis(methyl isobutyrate), 1,1'-azobis(cyano cyclohexane), other similar known compounds, and combinations thereof. In certain embodiments, the thermal initiator is an azo initiator available under the tradename Vazo®, such as, for example, Vazo® 67, available from E.I. du Pont de Nemours and Company, Wilmington, Del.

In certain embodiments disclosed herein, the thermal initiator may be added to the silica-infused crystalline polyester particle before or during laser sintering, such that the thermal initiator is activated during a melting/sintering step of a laser sintering process. Accordingly, in certain embodiments, crosslinking of silica-infused crystalline polyester particles initiated by a thermal initiator may occur during the melting/sintering step of a laser sintering process. In certain embodiments, the thermal initiator and the silica-infused crystalline polyester particle may be combined for a sufficient time and at a sufficient temperature during the printing process to form a crosslinked crystalline polyester. In certain embodiments, the thermal initiator and crystalline polyester may be heated to a temperature of from about 25° C. to about 120° C., such as from about 40° C. to about 110° C., from about 80° C. to about 100° C., or at least about 90° C., for a period of time ranging from about 1 minute to about 10 hours, such as from about 5 minutes to about 5 hours, to form a crosslinked crystalline polyester. According to various embodiments of the disclosure, during the SLS process, laser energy may penetrate through the top layer of a product being printed, causing the thermal initiator to cross link with vinyl/double bonds present in the crystalline polyester. When additional layers are laid during the printing process, crosslinking may occur between layers or inter-crosslinking may occur with the previously printed layer. In certain embodiments, products produced with the use of thermal initiator may exhibit increased mechanical strength over products produced absent a thermal initiator.

Initiators can be added in amounts ranging from about 0.01 to about 20 weight percent, such as from about 0.1 to about 10 weight percent, or from about 1 to 5 weight percent of the monomers.

Silica Nanoparticles

The crystalline polyester microparticles disclosed herein comprise an inorganic material such as silica nanoparticles. While not wishing to be bound by theory, it is believed that adding silica nanoparticles to the crystalline polyester polymeric matrix may provide hybrid microparticles with increased tensile strength, mechanical strength, and impact resistance, without increasing the brittleness of the crystalline polyester polymer matrix. Additionally, the addition of silica to the crystalline polyester may enhance both the initial particle/powder as well as any resultant parts manufactured through the use of 3D printing, such as SLS. In certain embodiments, the 3D printed parts produced using the silica-infused crystalline microparticles disclosed herein may have enhanced insulation properties, increased barrier properties to solvents and volatile products, and reduction in thermal degradation at high temperatures. By coating the crystalline polyester resin with silica nanoparticles, reduction of particle aggregation may be achieved, as well as reduction in electrostatic charge. Silica-infused crystalline polyester microparticles may find application as adhesives, protective coatings, biomaterials, composites, thin-films, microelectronics, etc.

Two forms of silica nanoparticles that may be used according to embodiments disclosed herein to enhance the properties of the crystalline polyester resins are colloidal silica and fumed silica. Fumed silica may be more cost-beneficial, but may not have adequate dispersibility. Colloidal silica has a narrow particle size distribution and is also tunable to different diameters, for example diameters ranging from about 20 nm to about 1 µm.

The amount of silica nanoparticles added to the crystalline polyester resin may affect the resultant properties of the silica-infused crystalline polyester microparticles, as well as resultant 3D items manufactured therefrom. Increasing the amount of silica nanoparticles may increase the tensile strength and impact resistance to an ideal amount, while not increasing the brittleness. In certain embodiments, the amount of silica added may range from about 1 weight % to about 80 wt %, such as from about 5 weight % to about 50 weight %, or from about 10 weight % to about 30 weight %, based on the weight of the crystalline polyester resin. In certain embodiments, the amount of silica added may be about 5 weight %, about 6 weight %, about 7 weight %, about 8 weight %, about 9 weight %, about 10 weight %, about 15 weight %, about 20 weight %, about 25 weight %, about 50 weight %, or about 55 weight %, based on the weight of the crystalline polyester resin.

In certain embodiments, the silica may be colloidal silica, such as the silica available under the tradename Ludox® AM. In certain embodiments, the silica comprises small silica nanoparticles, such as nanoparticles ranging from about 10 nm to about 120 nm, about 50 nm to about 110 nm, about 10 nm to about 15 nm, or about 12 nm. In certain embodiments, the silica nanoparticles disclosed herein are roughly spherical, non-porous, and dispersible in water, and in certain embodiments, the silica nanoparticles may comprise a surface covered by silanol (Si—OH) groups.

Preparation of Silica-Infused Crystalline Polyester Microspheres

The silica-infused crystalline polyester microparticles disclosed herein may be prepared by a variety of methods. The location of the silica in and/or on the crystalline polyester microparticle may be determined based on the method of preparation of the silica-infused crystalline polyester microparticle. Although silica has a relatively good affinity to polyester, the dispersibility of silica particles in polyester may be poor, as there can arise issues with coagulation, which may result in the formation of coarse protrusions on the surface of the particles. In certain embodiments, the silica-infused crystalline polyester microparticles disclosed herein have a substantially even dispersibility of the silica nanoparticles in and/or on the crystalline resin.

In one embodiment disclosed herein, there is a method of preparing the silica-infused crystalline microparticles by preparing a first solution comprising a crystalline polyester resin and a polymeric stabilizer by dissolving a crystalline polyester resin and a polymeric stabilizer in a water-miscible organic solvent. According to various embodiments of the disclosure, any polymer that is soluble in the solvent or shows affinity to the crystalline polyester resin may be effective as a polymeric stabilizer. Non-limiting exemplary polymeric stabilizers may include polystyrene, poly(vinyl acetate), poly(methyl methacrylate), poly(acrylonitrile), poly(dimethylsiloxane), poly(vinyl chloride), poly(ethylene), poly(propylene), poly(lauryl methacrylate), poly(oxyethylene), poly(acrylamide), poly(vinyl alcohol), poly(acrylic acid), poly(methacrylic acid), poly(vinyl pyrrolidone), poly(ethylene imine), poly(vinyl methyl ether), poly(4-vinylpyridine), poly(12-hydroxystearic acid), poly(isobutylene), cis-1:4-poly(isoprene), carboxymethyl cellulose, gelatin, Tween™ 80, Tween™ 20, hydroxypropylmethylcellulose, copovidone and polyvinylpyrrolidone, polyethyleneglycols (PEG), polymethacrylates, hypromellose acetate succinate, hypromellose phthalate, polyvinyl caprolactam-polyvinyl acetate-polyethylene glycol graft copolymer such as Soluplus®, polyvinyl acetate phthalate, and cellulose acetate phthalate. In certain embodiments, the polymeric stabilizer is polyvinyl alcohol, and in certain embodiments, the crystalline polyester and polymeric stabilizer may be dissolved at an elevated temperature, such as a temperature ranging from about 90° C. to about 100° C.

The water-miscible organic solvent may be chosen from those known in the art, such as, for example, alcohol, acetic acid, acetone, and acetamides, such as dimethyl acetamide. In certain exemplary embodiments, the water-miscible organic solvent is dimethyl acetamide (DMAc).

A second solution comprising silica nanoparticles and a water-soluble polymer, such as polyvinyl alcohol, may be prepared in water as an aqueous dispersion. Other water-soluble polymers that may be envisioned include, for example, polyvinyl alcohol, PEG and block copolymers containing PEG, such as, for example, poly(propylene oxide), poly(ethylene butylene), and poly(caprolactone); polyvinyl pyrrolidone, also known as povidone, polyvinyl pyrrolidone-vinyl acetate copolymer; polyacrylic acid; poly(acrylic acid) copolymers modified with block-copolymers of poly(ethylene oxide) and poly(propylene oxide); polyacrylamides; N-(2-Hydroxypropyl) methacrylamide; divinyl ether-maleic anhydride; poly(2-alkyl-2-oxazolines); polyphosphoesters such as polyphosphates and polyphosphonates; water-soluble polyphosphazenes such as poly[di(carboxylatophenoxy)phosphazene] and poly[di(methoxyethoxyethoxy) phosphazene]; natural water soluble polymers such as xanthan gum, pectin, N-carboxymethylchitosan, dextran, carrageenan, guar gum, cellulose ethers such as hydroxypropylmethyl cellulose, hydroxypropyl cellulose, hydroxyethyl cellulose and sodium carboxymethyl cellulose, hyaluronic acid, albumin, starch and starch-based derivatives; water-soluble polymers of N-vinylcarboxamides; and hydrophilic, anionic, and cationic surfactants. In certain embodiments, the water-soluble polymer is polyvinyl alcohol.

Then the second solution may be metered into the first solution and mixed to create a third solution, which results in the precipitation of the silica-infused crystalline polyester microparticles out of the third solution. The silica-infused crystalline polyester microparticles may then be filtered and dried. FIG. 1 is a schematic illustration of an exemplary silica-infused crystalline polyester microparticle prepared according to the process disclosed herein, wherein a second solution comprising silica nanoparticles and an aqueous dispersion of polyvinyl alcohol is metered into a first solution comprising a crystalline polyester resin and a polymeric stabilizer. In certain embodiments, the silica-infused crystalline polyester microparticles prepared according to the methods disclosed herein are cooled, such as slow cooled by reaching ambient temperature on their own, or quench cooled, for example with ice.

In another embodiment, the silica-infused crystalline polyester microparticles disclosed herein may be prepared by preparing a first solution comprising crystalline polyester microparticles and a polymeric stabilizer by dissolving crystalline polyester microparticles and a polymeric stabilizer, such as polyvinyl alcohol, in a water-miscible organic solvent, such as DMAc. In certain embodiments, the crystalline polyester microparticles and polymeric stabilizer may be dissolved at an elevated temperature, such as a temperature ranging from about 90° C. to about 100° C. Then an aqueous solution of a water-soluble polymer, such as polyvinyl alcohol, may be added to the first solution to create a second solution. After the aqueous solution of a water-soluble polymer has been added to the first solution to create a second solution, silica nanoparticles may be added to the second solution to create a third solution. In certain embodiments, the silica may be added to the second solution as an aqueous dispersion, and in certain embodiments, the silica may be added to the second solution as dry silica. In certain embodiments, the silica may added as an aqueous dispersion at an elevated temperature, such as a temperature ranging from about 90° C. to about 100° C. When the silica nanoparticles are added after the aqueous water-soluble polymer solution has been added, the resultant silica-infused crystalline polyester microparticles may contain silica dispersed on the surface of the microparticle.

Figure 2:
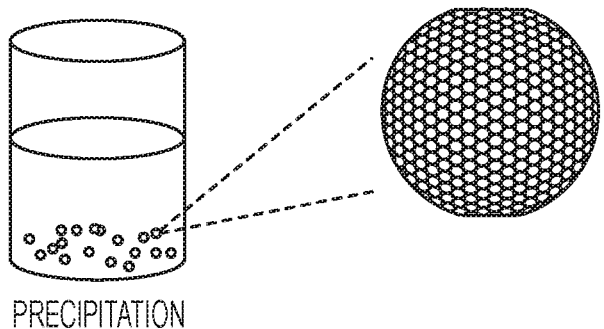
FIG. 2 is a schematic of an exemplary silica-infused microcrystalline particle prepared according to embodiments disclosed herein, showing silica nanoparticles on the surface of the crystalline polyester resin.

FIG. 2 is a schematic illustration of a silica-infused crystalline polyester microparticle prepared according to the process disclosed herein, wherein an aqueous dispersion of polyvinyl alcohol is added to a first solution comprising a crystalline polyester resin and a polymeric stabilizer to create a second solution, and then silica nanoparticles are added to the second solution.

Figure 3:
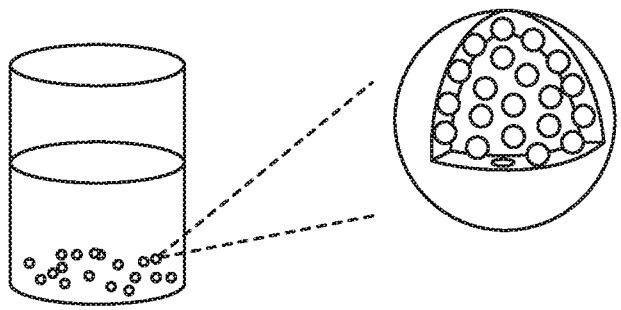
FIG. 3 is a schematic of an exemplary silica-infused microcrystalline particle prepared according to embodiments disclosed herein, showing silica nanoparticles embedded with in the matrix of the crystalline polyester resin.

In another embodiment, the silica-infused crystalline polyester microparticles disclosed herein may be prepared by preparing a first solution comprising crystalline polyester resin, a polymeric stabilizer, and silica nanoparticles in a water-miscible organic solvent, such as DMAc. In certain embodiments, the crystalline polyester resin, silica nanoparticles, and polymeric stabilizer may be heated during dissolution, such as to a temperature ranging from about 90° C. to about 100° C. An aqueous dispersion of a water-soluble polymer such as polyvinyl alcohol may then be added to the first solution, resulting in the precipitation of the silica-infused crystalline polyester microparticles out of the first solution. When the silica nanoparticles are added concurrently with the crystalline polyester resin and polymeric stabilizer, the resultant silica-infused CPE microparticles may contain silica dispersed throughout the body of the microparticle. FIG. 3 is a schematic illustration of a silica-infused crystalline polyester microparticle prepared according to the process disclosed herein, wherein an aqueous dispersion of polyvinyl alcohol is added to a first solution comprising a crystalline polyester resin, a polymeric stabilizer, and silica nanoparticles.

In certain embodiments, the ratio of crystalline polyester resin to the water-miscible organic solvent is about 0.1:1 to about 1:1, such as, for example, about 0.15:1, about 0.16:1, about 0.17:1, or about 0.2:1.

In certain embodiments, the silica nanoparticles of the silica-infused crystalline polyester microparticles disclosed herein may be detected by inductively coupled plasma (ICP), such as inductively coupled plasma mass spectrometry (spICP-MS), which has the capability to detect and characterize nanomaterials at environmentally relevant concentrations in complex environmental and biological matrices. Scanning electron microscopes (SEM) can also visually detect silica within the microparticles.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

EXAMPLES

Example 1

Preparation of Crystalline Polyester

An unsaturated crystalline polyester was prepared with fumaric acid and a mixture of 25 mole % 1,4-butanediol and 75 mole % 1,6-hexanediol. A 2-liter Buchi Reactor equipped with a mechanical stirrer, distillation apparatus and bottom drain valve was charged with fumaric acid (479.5 grams), 1,4-butanediol (94.6 grams), and 1,6-hexanediol (375.5 grams). The mixture was heated under nitrogen to 165° C. over a 1 hour period. Stirring was started when the batch temperature reached 120° C. The reaction temperature was then increased by 0.5° C. per minute until the batch temperature reached 191° C. Viscosity measurements were taken with a Brookfield viscometer at 120° C. (100 rpm), and then periodically sampled until the viscosity reached 170 Pa. The reaction mixture was discharged into a metal container and allowed to cool overnight to room temperature.

The resulting precipitate was filtered, and the properties of the crystalline polyester were analyzed. The acid value of the prepared crystalline polyester was 15.2 mg KOH/g resin, and the viscosity at 120° C. was 170 Pa at 120° C. (100 rpm). The crystalline polyester was analyzed by DSC, wherein the $T_m$ was 93.0° C. and the $T_c$ was 58.6° C., having a heat of fusion of 37.7 J/g.

Example 2

Preparation of Silica-Infused Crystalline Polyester Microparticles

Four different batches A-D of silica-infused crystalline microparticles were prepared according to the embodiments disclosed herein.

Batch A: Batch A was prepared by mixing 50.26 g crystalline polyester and 19.5 g polyvinyl alcohol in 290.18 g DMAc to create a first solution. Then 55.7 weight % Ludox® $SiO_2$ (relative to the crystalline polyester) was mixed with 193 g (2.2 wt %) of polyvinyl alcohol in an aqueous solution. Next, the $SiO_2$/polyvinyl alcohol aqueous solution was mixed into the first solution, such that the $SiO_2$/polyvinyl alcohol aqueous solution acted as the solvent that caused the precipitation of the silica-infused crystalline polyester microparticles. The microparticles were left to reach ambient temperature on their own. Batch A had the highest loading of silica of the four batches prepared. The particle size, determined by SEM, ranged from about 30 μm to about 45 μm.

Table 1 below shows the count and distribution of particles for Batch A (slow-cooled). It has been observed that slow-cooled particles typically have wider particle size distributions than fast-cooled or quenched particles. While not wishing to be bound by theory, it is believed that during the slow cooling process there is sufficient time for the crystals to form, while faster cooling methods such as quenching with ice reduces the time for crystal nucleation and growth. This may be evidenced by SEM of the particle surfaces, wherein more crystallites/crystal-like order is seen on the slow-cooled particle surfaces.

TABLE 1

Particle size count of Batch A

|  | Perimeter (μm) | Max diameter (μm) | Min diameter (μm) |
| --- | --- | --- | --- |
| Average | 137 | 45 | 30 |
| Standard deviation | 99 | 31 | 22 |
| Max | 885 | 258 | 197 |
| Min | 0 | 0 | 0 |
| Total | 207,745 | 68,446 | 46,035 |

Batch B: Batch B was prepared by mixing 52.80 g crystalline polyester and 16.60 g polyvinyl alcohol in 257.90 g DMAc to create a first solution. Then 26.8 weight % Ludox® $SiO_2$ (relative to crystalline polyester) was mixed with 442 g (3.7 wt %) of polyvinyl alcohol in an aqueous solution. Next, the $SiO_2$/polyvinyl alcohol aqueous solution was mixed into the first solution, such that the $SiO_2$/polyvinyl alcohol aqueous solution acted as the solvent that caused the precipitation of the silica-infused crystalline polyester microparticles. Batch B was quench cooled with ice instead of letting the microparticles reach ambient temperature on their own. Batch B had the second highest loading of silica of the four batches prepared. The particle size, determined by SEM, ranged from about 36 μm to about 50 μm.

Table 2 below shows the count and distribution of particles for Batch B (fast-cooled). As discussed above, it is believed that fast-cooled or quenched particles typically do not have as wide of a particle size distribution as slow-cooled particles.

TABLE 2

Particle size count of Batch B

|  | Perimeter (μm) | Max diameter (μm) | Min diameter (μm) |
| --- | --- | --- | --- |
| Average | 151 | 50 | 36 |
| Standard deviation | 115 | 34 | 29 |
| Max | 1190 | 320 | 287 |
| Min | 0 | 0 | 0 |
| Total | 111,212 | 36,443 | 26,273 |

Batch C: Batch C was prepared by mixing 7.8% silica with 50.0 g crystalline polyester and 8.0 g polyvinyl alcohol in 250.0 g DMAc. Next, an aqueous solution of 274.8 g (1.7 wt %) of polyvinyl alcohol in aqueous solution was metered into the silica/crystalline polyester/polyvinyl alcohol mixture. The mixture resulted in large particles due to premature precipitation of particles in the organic phase even before the aqueous polyvinyl alcohol solution was metered in. The water from the colloidal silica dispersion began seeding the microparticles before the polyvinyl alcohol addition, so the particles were larger. The particle size, determined by SEM, ranged from about 580 µm to about 2150 µm, with the highest concentration of particles ranging from about 650 to about 950 µm (800 µm±150 µm). The silica-infused microparticles were very large and spherical.

Batch D: The last batch, Batch D, was prepared by first mixing 40.0 g crystalline polyester with 11.0 g polyvinyl alcohol in 254.5 g DMAc. Next, 274.8 g (1.7 wt %) of polyvinyl alcohol in aqueous solution was mixed into the crystalline polyester/polyvinyl alcohol solution. Finally, after the addition of all of the aqueous polyvinyl alcohol, 10.1% colloidal silica at 90° C. was slowly pipetted into the solution of crystalline polyester/polyvinyl alcohol. The particle size, determined by SEM, was very wide, ranging from about 5 µm to about 350 µm. The highest concentration of particles ranged from about 20 to about 60 µm. These particles, like Batch A, had large voids at the surface. Some particles also had smaller particles embedded within.

Batch D had the least amount of silica present, even though the loading was higher than Batch C. This is due to the silica being added after the aqueous polyvinyl alcohol solution during the manufacture of Batch D. It is possible that silica was removed during the washing step, since the silica nanoparticles may have been loosely adhered to the surface of the crystalline polyester microparticles.

Table 3 below details the preparation specifications for the four batches of silica-infused microparticles prepared.

TABLE 3

Experimental details for silica-infused crystalline polyester microparticles

|  | Batch A | Batch B | Batch C | Batch D |
|---|---|---|---|---|
| Crystalline polyester (g) | 50.26 | 52.80 | 50.0 | 40.0 |
| Polyvinyl (g) | 19.50 (78K) | 16.60 (27K) | 8.0 (78K) | 11.0 (78K) |
| DMAc (g) | 290.18 | 257.90 | 250.0 | 254.5 |
| Wt %/PVA (g) aq. solution added | 2.2 wt %/193 (78K) | 3.7 wt %/442 (27K) | 1.7 wt %/ 602.6 g (78K) | 1.7% wt %/ 274.8 (78K) |
| CPE:DMAc Ratio | 0.17:1 | 0.20:1 | 0.20:1 | 0.16:1 |
| % SiO$_2$ (Ludox ®) relative to crystalline polyester | 55.7% | 26.8% | 7.8% | 10.1% |
| Average particle size by SEM | ~30-45 µm | ~36-50 µm | ~580-2150 µm | ~5-350 µm |

The amount of silica in ppm was measured by ICP and compared with the heat of fusion of the microparticles as measured by DSC. As the amount of silica decreased in the microparticles, the heat of fusion (i.e., the amount of heat required to convert unit mass of a solid into the liquid/melt state without a change in temperature; ΔH) increased, as shown in Table 4 below. This feature of silica-infused CPE particles enables the microparticles to require less energy during sintering of the microparticles.

TABLE 4

Heat of Fusion of Silica-Infused Crystalline Polyester Microparticles

| Batch | Silica (ppm) | Silica (%) | 2nd Heat ΔH (J/g) |
|---|---|---|---|
| Batch A | 316.6 | 0.0317% | 37.937 |
| Batch B | 103.7 | 0.0104% | 38.98 |
| Batch C | 43.69 | 0.0044% | 40.401 |
| Batch D | 29.6 | 0.0030% | 44.148 |

Example 3

Sintering

Testing of particles for sintering ability was performed using the Sharebot SnowWhite printer, which is based on selective laser sintering (SLS). This printer uses thermoplastic powders that are created into three-dimensional objects, which are fabricated from a digital file in CAD. The polymer powder may be sintered and fused into thin layers at the same time, which enables the construction of small objects with excellent definition. The printer uses a $CO_2$ laser, allowing it to sinter a wide range of powders, such as nylons.

Six different powders (a traditional nylon resin PA-11, crystalline polyester without silica, and the four batches of silica-infused crystalline polyester prepared as discussed above in Example 2) were first bar coated on black glossy paper. The PA-11 resulted in a coating on the paper that was uniform and well-coated. The crystalline polyester (ground, without silica) resulted in a coating on the paper that was not uniform. Table 5 below details the results of the sieve and bar coating for the four prepared Batches A-D.

TABLE 5

Sieve and Bar Coating Results

|  | Batch A | Batch B | Batch C | Batch D |
|---|---|---|---|---|
| Sieve | A large amount of material left in sieve | Hard to sieve; large flakes | Particles too large to sieve with 150 mesh | Very little material left in sieve |
| 40 mil gap bar coating | Uniform; coated well | Uniform; coated well | Not coated; couldn't sieve | Uniform; coated well |
| Surface texture | Slightly granular top surface coating | Slightly granular top surface coating | Not coated | Relatively smooth surface |

The powders were laser sintered at both 25% and 30% laser power. The crystalline polyester (ground, without silica) did not sinter at 25% power, and the PA-11 powder did sintered. The PA-11 powder was further sintered at 20%, 30%, 35%, and 40% power. At 20% power, the PA-11 did not sinter. At 25% power, the PA-11 powder sintered, with a faint outline visible. At 30% power, the PA-11 powder sintered and was easier to see, and at 35% power, the PA-11 powder sintered and was very visible. At 40% power, the edges of the sintered material exhibited curling.

The results of the laser sintering of the four prepared Batches A-D of silica-infused microparticles under different conditions are shown below in Table 6.

TABLE 6

Sintering Results

| | Batch A | Batch B | Batch C | Batch D |
|---|---|---|---|---|
| Laser sintering at 25% power | Did not sinter | Did not sinter | Excluded due to large particle size | Sintered |
| Laser sintering at 30% power; (LR 50K) | Robust; very slightly porous | Robust; slightly porous | Excluded due to large particle size | Robust; sintered |
| Laser sintering at 30% power; (LR 40K) | Robust; very slightly porous | Robust; slightly porous | Excluded due to large particle size | Robust; sintered |
| Laser sintering at 60% power; (LR 40K) | Warped; shrunk | Border visible; some porosity | Excluded due to large particle size | Robust; sintered |

Printed single layer squares were prepared that were 30 mm×30 mm originally. The values below in Table 7 are measurements taken after various laser sintering parameters of a 30 mm×30 mm square.

TABLE 7

Shrinkage measurements of 30 mm × 30 mm printed single layer squares

| | Batch A | Batch B | Batch D |
|---|---|---|---|
| Laser Power at 30% (LR 50K) | 29.37 mm | 29.93 mm | 30.48 mm |
| | 29.87 mm | 30.16 mm | 30.12 mm |
| Laser Power at 30% (LR 40K) | 29.75 mm | 30.18 mm | 30.16 mm |
| | 29.40 mm | 30.02 mm | 30.13 mm |
| Laser Power at 60% (LR 40K) | 26.27 mm | 29.41 mm | 30.27 mm |
| | 27.55 mm | 30.07 mm | 30.47 mm |

What is claimed is:

1. A powder composition comprising:
a silica-infused crystalline polyester particle for laser sintering comprising at least one crystalline polyester resin and silica nanoparticles present in the particle in an amount ranging from about 5% to about 60% by weight relative to a total weight of the particle,
wherein the crystalline polyester resin is an unsaturated crystalline polyester resin derived from at least one organic diacid and at least one polyol that is a mixture of 1,4-butanediol and 1,6-hexanediol.

2. The powder composition of claim 1, wherein the silica nanoparticles are present in the particle in an amount ranging from about 10% to about 60% by weight relative to the total weight of the particle.

3. The powder composition of claim 1, wherein the at least one organic diacid is fumaric acid.

4. The powder composition of claim 1, wherein silica-infused crystalline polyester particle has a volume-average particle diameter ranging from about 5 microns to about 500 microns.

5. The powder composition of claim 1, wherein silica-infused crystalline polyester particle has a volume-average particle diameter ranging from about 30 microns to about 50 microns.

6. The powder composition of claim 1, wherein a melting temperature ($T_m$) of the silica-infused crystalline polyester particle ranges from about 50° C. to about 100° C.

7. A method for manufacturing the silica-infused crystalline polyester particle for laser sintering according to claim 1 comprising:
preparing a solution comprising a crystalline polyester resin and a polymeric stabilizer dissolved in an organic solvent;
adding an aqueous solution of a water-soluble polymer and silica nanoparticles to the solution; and
precipitating a silica-infused crystalline polyester particle,
wherein the crystalline polyester resin is an unsaturated crystalline polyester resin derived from at least one organic diacid and at least one polyol that is a mixture of 1,4-butanediol and 1,6-hexanediol.

8. The method of claim 7, wherein the aqueous solution of a water-soluble polymer is added to the solution before the silica nanoparticles are added to the solution.

9. The method of claim 7, wherein the water-soluble polymer is polyvinyl alcohol.

10. The method of claim 7, further comprising adding at least one thermal initiator to the solution.

11. The method of claim 7, wherein the polymeric stabilizer is polyvinyl alcohol.

12. The method of claim 7, wherein the crystalline polyester resin and the polymeric stabilizer are dissolved in the organic solvent at a temperature ranging from about 80° C. to about 100° C.

13. The method of claim 7, wherein the silica nanoparticles are added to the solution in an amount such that the silica nanoparticles are present in the silica-infused crystalline polyester particle in an amount ranging from about 10% to about 60% by weight relative to the total weight of the particle.

14. A method for manufacturing the silica-infused crystalline polyester particle for laser sintering according to claim 1 comprising:
preparing a solution comprising crystalline polyester resin, silica nanoparticles, and a polymeric stabilizer dissolved in an organic solvent;
adding an aqueous solution of a water-soluble polymer to the solution; and
precipitating a silica-infused crystalline polyester particle,
wherein the crystalline polyester resin is an unsaturated crystalline polyester resin derived from at least one organic diacid and at least one polyol that is a mixture of 1,4-butanediol and 1,6-hexanediol.

15. The method of claim 14, wherein the water-soluble polymer is polyvinyl alcohol.

16. The method of claim 14, further comprising adding at least one thermal initiator to the solution.

17. The method of claim 14, wherein the crystalline polyester resin, silica nanoparticles, and the polymeric stabilizer are dissolved in the organic solvent at a temperature ranging from about 80° C. to about 100° C.

18. The method of claim 14, wherein the silica nanoparticles are added to the solution in an amount such that the silica nanoparticles are present in the particle an amount ranging from about 10% to about 60% by weight relative to the total weight of the particle.

* * * * *